(12) United States Patent
Keil

(10) Patent No.: US 7,286,726 B1
(45) Date of Patent: Oct. 23, 2007

(54) INTEGRATED ACTIVE ELECTRICAL WAVEGUIDE FOR OPTICAL WAVEGUIDE MODULATORS

(75) Inventor: Ulrich Dieter Felix Keil, Broenshoej (DK)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 11/395,091

(22) Filed: Mar. 31, 2006

(51) Int. Cl.
*G02F 1/01* (2006.01)
*G02F 1/035* (2006.01)

(52) U.S. Cl. .................. 385/1; 385/3; 385/4; 385/8; 385/11

(58) Field of Classification Search .......... 385/1–4, 385/8, 11
See application file for complete search history.

(56) References Cited

U.S. PATENT DOCUMENTS

| | | | | |
|---|---|---|---|---|
| 4,958,898 A | * | 9/1990 | Friedman et al. ............ | 385/3 |
| 5,355,422 A | * | 10/1994 | Sullivan et al. ............. | 385/1 |
| 5,550,513 A | * | 8/1996 | Wong ....................... | 330/286 |
| 6,836,185 B1 | * | 12/2004 | Pobanz ..................... | 330/260 |
| 2003/0206676 A1 | * | 11/2003 | Ovadia et al. .............. | 385/11 |

OTHER PUBLICATIONS

Dean Samara-Rubio, et al., "Customized Drive Electronics to Extend Silicon Optical Modulators to 4 Gb/s", Journal of Lightwave Technology, vol. 23, No. 12., Dec. 2005. 10 pages.
Ansheng Liu, et al., "Recent Development in silicon photonics: 2.5 Gb/s silicon optical modulator and silicon Raman laser", Intel Corporation, pp. 1-14.
Ling Liao, et al., "High speed silicon Mach-Zehnder Modulator", Intel Corporation, pp. 1-7.
Ling Liao, et al., "2.5 Gb/s Silicon-based Optical Modulator", Intel Corporation, pp. 1-5.

* cited by examiner

*Primary Examiner*—Hemang Sanghavi
(74) *Attorney, Agent, or Firm*—Blakely, Sokoloff, Taylor & Zafman LLP

(57) ABSTRACT

An integrated active electrical waveguide is described for optical waveguide modulators. The active waveguide may include an optical waveguide, a plurality of modulators integrated into the waveguide to modulate the index of refraction of the waveguide, and a plurality of local amplifiers, each coupled to a modulator.

18 Claims, 6 Drawing Sheets

INTEGRATED ACTIVE ELECTRICAL WAVEGUIDE FOR OPTICAL WAVEGUIDE MODULATORS

FIELD

The present description relates to optical waveguides for optical communications and, in particular, to driving a phase modulator to compensate for the inherent capacitance of a waveguide.

BACKGROUND

Electro-optic modulators find significant use in fiber optic communication systems to modulate data onto a light beam. Light is conducted through a waveguide and electrical signals are applied across the waveguide to apply a modulation to the light beam. Lithium niobate is a common material for such modulators because it works well as a waveguide for light and also exhibits excellent properties for modulating light with electrical inputs. However, lithium niobate is not a good material for semiconductor circuitry. As a result, a lithium niobate modulator requires a separate chip, typically silicon, to carry circuitry for the phase modulator. Electrical wires connect the two silicon chip outputs to the lithium niobate chip. In addition, modulating light with a lithium niobate modulator requires typically a swing of 5 V; a swing that modern CMOS processes cannot easily supply. A much less expensive modulator may be made by putting both the circuitry and the waveguide on the same chip, however, silicon is not a good material for a light waveguide.

In order to have a long interaction length between the electrical signal and optical wave in an electro-optic modulator, most electro-optic modulators include a long waveguide. An example of such a waveguide is a Mach-Zehnder lithium niobate modulator. Such a modulator will normally have electro-optic material (i.e. lithium niobate) embedded in an electrical waveguide with the modulating electrical field penetrating the electro-optic material of the optical waveguide. The electrical waveguide will typically have a characteristic impedance of about 50 Ohms and can be driven by a 50 Ohm driver.

Semiconductor modulators constructed similar to a Mach Zehner lithium niobate modulator have a much higher capacitance per unit length. This creates a much higher electrical load and a much slower phase velocity. The low phase velocity can cause a phase mismatch between the optical and the electrical wave as the two waves travel along the waveguide. One effect of the phase mismatch is to limit the maximum data rate of the communication system that uses the semiconductor modulator.

It is very difficult to change the inductance per unit length of a semiconductor waveguide by changing its geometry, that is the shape, depth, width, or length of the waveguide. The inductance is only weakly dependent on the geometry of the waveguide and normally will remain within a range of 1 to 1.3 nH/mm. Changing the waveguide geometry also has other significant effects on the modulator and the geometry cannot be changed freely without considering the many other factors that are affected.

BRIEF DESCRIPTION OF THE DRAWINGS

Embodiments of the present invention will be understood more fully from the detailed description given below and from the accompanying drawings of various embodiments of the invention. The drawings, however, should not be taken to be limiting, but are for explanation and understanding only.

DETAILED DESCRIPTION

Active components, that is electrical driver stages may be made an integral part of an electrical waveguide. The optical components and the active electrical components may be integrated in one process on a single semiconductor substrate or placed in close proximity. A waveguide modulator and all of its drive circuitry may be formed on a single silicon substrate using a bipolar junction CMOS (Complementary Metal Oxide Semiconductor) process.

Figure 1:
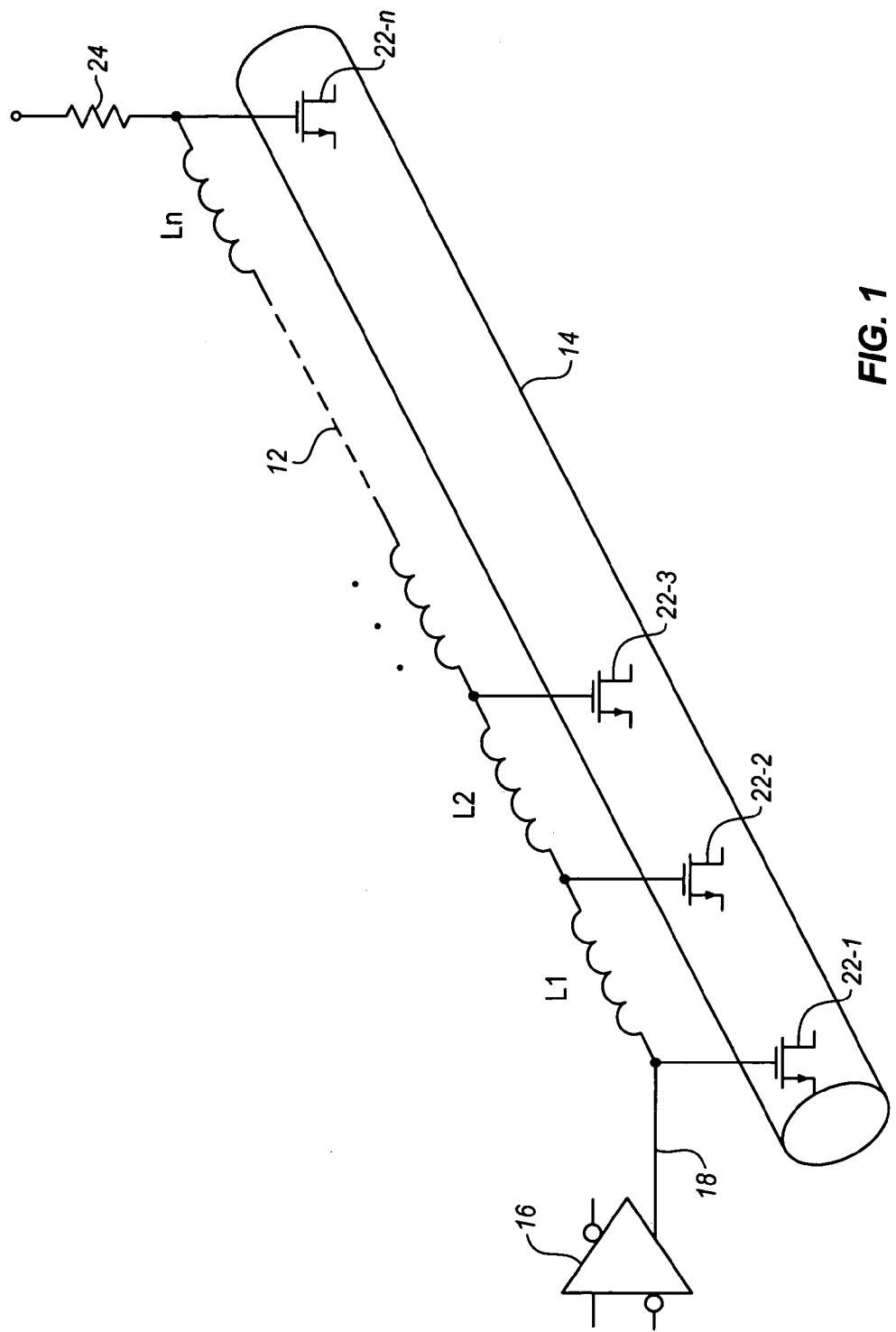
FIG. 1 is a functional electrical diagram of a waveguide and a modulator driver circuit according to an embodiment of the invention.

FIG. 1 is a schematic representation of an electrical waveguide 12 guiding an electrical wave along an optical waveguide 14. The optical waveguide has a total inductance L produced by adding up the inductance along the length of the waveguide. This is indicated in a segmented basis as L1, L2, to Ln. The inductors shown in FIG. 1 represent the inherent inductance of the waveguide. The capacitance given by the metal contacts of the waveguide is small compared to the load and is not shown. Such a waveguide may be used in a wide variety of different applications including with an electro absorption modulator, a Mach Zehnder modulator, a Mach Zehnder interferometer, optical transmitters and receivers, optical network interface cards and optical routers.

As mentioned above, such a silicon waveguide has a high capacitance C per unit length. The high capacitance makes the waveguide a high load $Z_o$. The load may be determined by $Z_o=(L/C)^{1/2}$. The high capacitance also creates a high phase velocity $v_{ph}$ through the waveguide. The phase velocity may be determined by $v_{ph}=2\pi/(LC)^{1/2}$.

In one embodiment, and as shown in FIG. 1, a driver 16 is coupled to the waveguide through a wire line, bonding pad or copper trace or other conductive material 18. In the example of FIG. 1, the line is configured like a tapped transmission line. However, it may take many other forms, such as a tree structure or a variety of other structures. The particular structure may be selected to add or eliminate an inherent delay pattern. The driver may supply the full voltage swing of the electrical waveguide (for example 2 V). This voltage is supplied to a series of gates 22-1, 22-2, 22-3 to 22-n along the length of the optical waveguide. The driver drives a voltage along a common bus that is coupled in parallel to each transistor gate. A termination resistor 24 may be provided opposite the driver.

The charge carriers on the polysilicon gate change the refractive index of the waveguide. The source and drain of the transistors may be grounded. The change in the refractive index may be used to shift or modulate the phase of the light in the waveguide. Such phase shifters may be used to modulate data onto the light wave and also to compensate for the high capacitance. While the present invention is described in the context of CMOS process and structure, embodiments of the invention may be adapted to other technologies and materials.

An active driver circuit can be implemented in a variety of different ways to reduce the capacitance of the waveguide and reduce the phase velocity of light traveling through the waveguide. One simple way is to put a level-shifter (not shown) implemented as a source follower or emitter follower between the driver 16 and the transistors 22. This decouples the load capacitance from the waveguide. The level-shifter works as an impedance transformer. This increases the phase velocity and reduces the phase mismatch between the optical wave and the electrical wave as light travels across the waveguide.

In such an implementation, there may be power lost in the termination resistor in proportion to the square of the voltage provided by the driver. In addition, the input capacitances of the level-shifter may be non-linear across the voltage swing. This may lead to distortion in the optical signal conducted through the waveguide. An impedance transformer stage may be implemented in a compact way with a few components or in a complex way with many additional components and features (not shown). In one embodiment, the level shifter uses at least two transistors.

Figure 2:
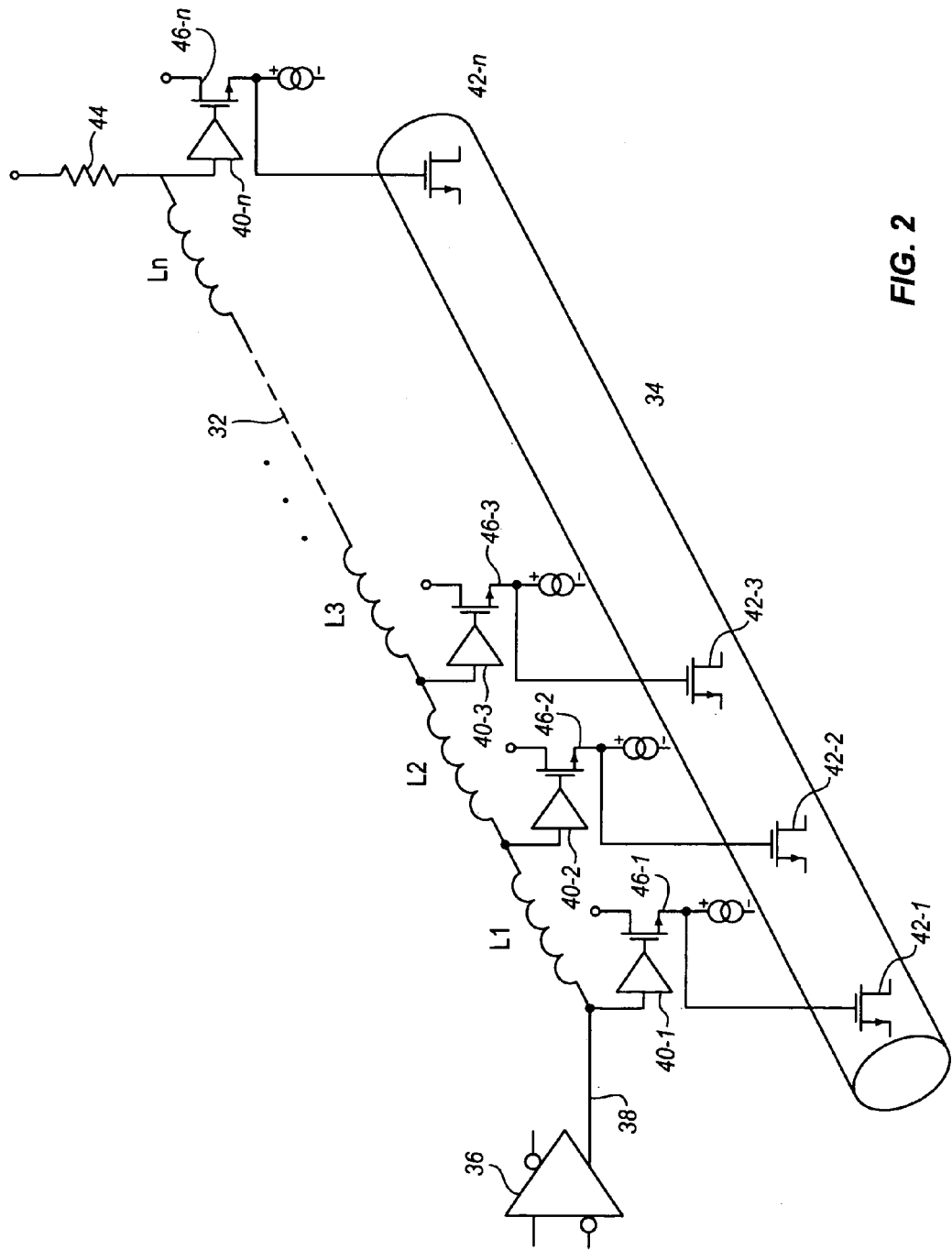
FIG. 2 is a functional electrical diagram of a waveguide with active drive circuits according to an embodiment of the invention.

FIG. 2 shows an alternative drive circuit having an active waveguide with a set of amplifying stages. In this example, a full local amplifier stage is shown with a level-shifter 36, coupled to a bus 38 that extends along the length of the waveguide. A buffer 40-1, 40-2, 40-3 to 40-$n$ and another level-shifter 46-1, 46-2, 46-3 to 46-$n$ are integrated in close proximity to the optical waveguide. The first level-shifter is connected in parallel to a set of transistors 42-1, 42-2, 42-3 to 42-$n$ through a buffer, level-shifter combination for each transistor. The transistors are coupled along the length of the waveguide at roughly even distances to the optical waveguide 34. A termination 44 is coupled to the voltage bus as in FIG. 1 opposite the first voltage driver. In the example of FIG. 2, due to the additional buffer 40, level-shifter 46 combination for each gate 42, the voltage swing on the transmission line can be kept at levels that are commonly supported using conventional silicon semiconductor circuitry. This may be a range, for example of 250 mV to 600 mV, significantly less than the voltage swing for FIG. 1 of, for example, 2 V.

As compared to the relatively high capacitance per unit length of the waveguide, the drivers 40-1 to 40-$n$ may be designed to have a much lower input capacitance. This leads to a higher characteristic impedance for the circuit as a whole and, as a result, a higher resistance termination resistor. The higher resistance results in less power being wasted than in for example, the FIG. 1 design. The reduction in lost power provides cooler and more efficient operation. This is also reflected in the lower voltage requirements for the drivers. As mentioned above, the FIG. 1 embodiment may require a 2 V swing, while the FIG. 2 embodiment may require only a tenth as much.

Considering the waveguide and coupled transistors in more detail, the device is based on the free-carrier plasma dispersion effect, which may be exploited to create an electrically controllable optical path length for photons with energies below the bandgap energy. In silicon, the bandgap energy is approximately 1.1 eV, and the waveguide is operated with photon energies of roughly 0.8 eV. In addition to altering the effective path length of the waveguide, the free-carriers absorb some of the light in the waveguide. This effect is manifested as a small voltage-dependent loss (VDL).

The Table provides test results that demonstrate how the propagation speed of an optical signal is affected by the driver for the transistors coupled to a silicon waveguide. The values of the Table are taken from a design with 0.25 µm CMOS and 70 GHz $f_T$ bipolar BiCMOS process applied to a silicon-based Mach-Zehnder modulator.

Several different waveguide versions were tested for the data of the Table. The passive waveguide, version A, corresponds to a waveguide with no driver circuits or coupled transistors as shown, for example in FIG. 1. A waveguide with emitter follower or source follower, versions B and C, is not shown. The waveguide with an integrated amplifier stage, version D, corresponds to the waveguide of FIG. 2.

The characteristics of the different implementations of the electrical waveguides include inductance per mm of waveguide (L/mm) as suggested by the inductors L1, L2, L3, to Ln in the figures, capacitance per mm of waveguide (C/mm). Vph, the phase velocity of the electrical wave in meters per second, $Z_0$, the characteristic impedance of the waveguide, and $\Delta\tau/4$ mm, the propagation time mismatch between the optical wave ($v_{opt}=8.5*10^7$ m/s) and the electrical wave for the tested (4 mm long) waveguide.

Referring to the Table, for the tested 2.5 Gbps modulated signal with a period of 400 ps the $\Delta\tau$ through the passive waveguide (version A) represents almost a full period. As a result, at the end of the waveguide, the electrical signal does not contribute constructively to the optical signal at all. A rough estimation of the maximum acceptable $\Delta\tau$ is about 200 ps for 2.5 Gbps and 50 ps for 10 Gbps. Based on this estimate, the waveguide with level-shifter (versions B and C) is suitable for data rates up to 2.5 Gbps and the waveguide with integrated amplifier (version D) for 10 Gbps or higher.

TABLE

|  | A) Passive | B) with emitter follower | C) with source follower | D) with integrated amplifier stage |
| --- | --- | --- | --- | --- |
| L/mm | 1.3 nH | 1.3 nH | 1.3 nH | 1.3 nH |
| C/mm | 9 pF | 0.7 pF | 0.9 pF | 0.1 pF |
| $v_{ph}$ (m/s) | $9.2 * 10^6$ | $3.3 * 10^7$ | $2.9 * 10^7$ | $8.8 * 10^7$ |
| $n_{eff}$ | 33 | 9 | 10 | 3.4 |
| $Z_0$ | 12 Ω | 43 Ω | 38 Ω | 114 Ω |
| $\Delta\tau/4$ mm | 390 ps | 73 ps | 90 ps | −2 ps |

Figure 3:
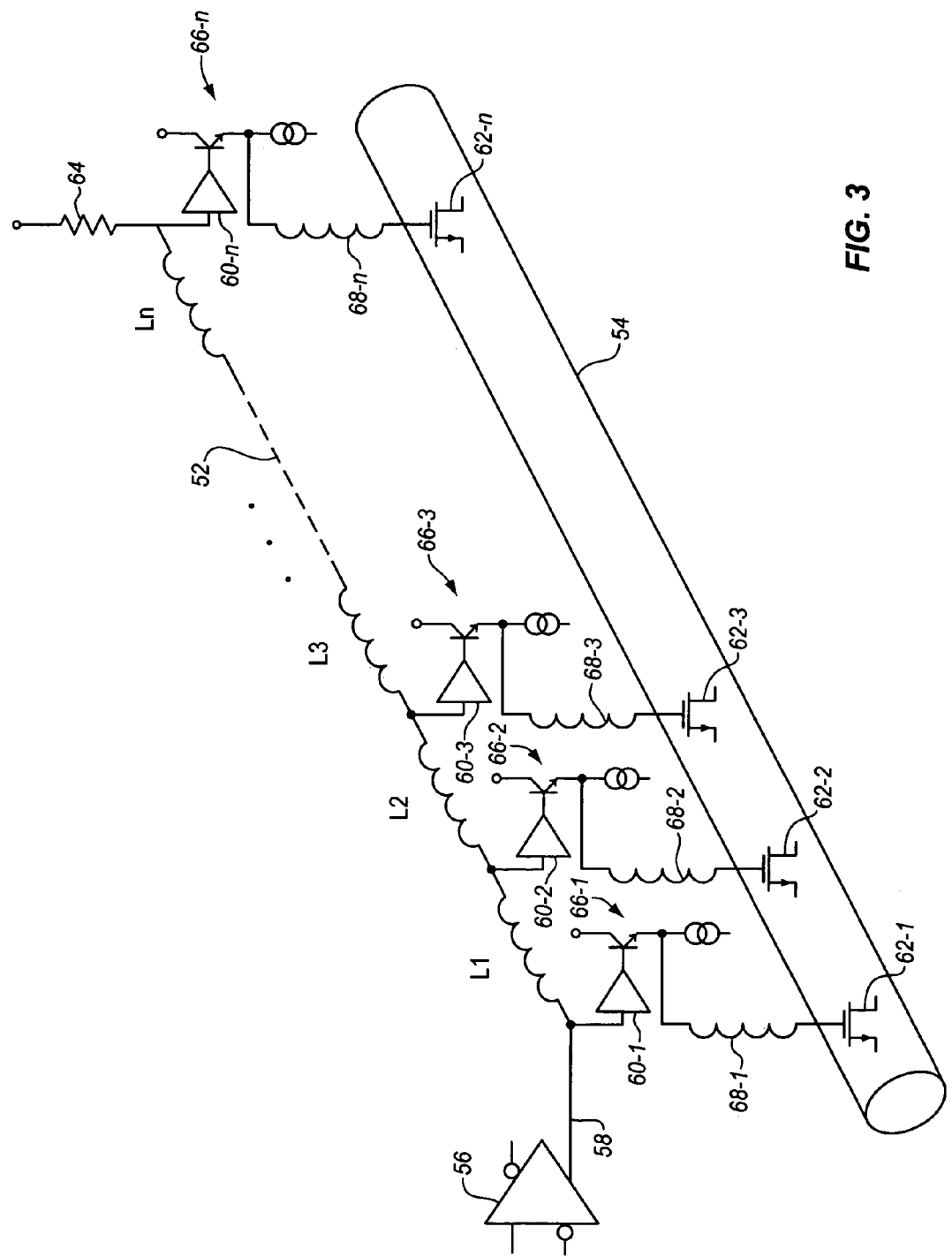
FIG. 3 is a functional electrical diagram of a waveguide with alternative active drive circuits according to an embodiment of the invention.

FIG. 2 shows that the active stages may be integrated onto the same substrate as the waveguide, FIG. 3 shows an alternative embodiment in which the active stages are in a separate chip that is coupled with wires to the waveguide. This is the configuration used for the testing that generated the numbers of the Table. In FIG. 3, the electrical components are implemented on one chip and the optical modulator on another. The modulator drivers are connected to the optical waveguide through bond wires. In the equivalent circuit shown in FIG. 3, the bond wires connecting the two chips are represented by inductors 68. These bond wires limit the bandwidth of the driver-modulator system to about 2.5 Gbps. For higher data rates, the bond wires may be minimized or avoided. However, just as in the example shown in FIG. 2, the lightly loaded transmission line shown in FIG. 3 is able to match or exceed the propagation speed of the optical waveguide.

As for the other features of FIG. 3, there is also a full local amplifier with a level-shifter 56, a buffer 60-1, 60-2, 60-3 to 60-$n$ and another level-shifter 66-1, 66-2, 66-3 to 66-$n$ integrated close to the optical waveguide. As in FIG. 2, the first level-shifter is connected in parallel to a set of transistors 62-1, 62-2, 62-3 to 62-$n$ through a buffer, level-shifter combination for each transistor. The transistors are coupled to an optical waveguide 54. A termination 64 is coupled to the voltage bus 58 opposite the first voltage driver.

The system of FIG. 3 provides a robust circuit and packaging platform capable of testing modulators with a variety of different electrical circuits. The bond wires are coupled to the waveguide using a series of bond pads. The bond pads are coupled to a dual-drive Mach-Zehnder Interferometer with 20-30 pF capacitance per arm for the radio frequency (RF) segments, a minimum peak-to-peak single-ended voltage swing of 2.0 Vpp, and a target operating bandwidth of 2.5 Gb/s.

The physical interface between the driver and modulator gives a low inductance while still allowing for a simple wire-bonding technique. Each section of the waveguide has a bond pad for the two differential signals (applied to the p-type poly-Si gates of the phase shifters) and a bond pad for the RF return path (connected to the modulator n-type substrate).

The optical interferometer bias point may be controlled by voltages taken directly from the PCB that carries the driver chip and modulator chip. This includes the modulator substrate direct current (dc) voltage, which may be connected to the lowest potential in the system $V_{EE}$. For the phase shifters of FIGS. 1, 2, and 3, a waveguide of, for example, 2.5 $\mu m \times 2.3$ $\mu m$ and a 12-nm gate oxide with a 2 Vpp may give approximately 2.5 dB ER. In another example, the modulator may be based on a scaled waveguide with principal dimensions of 1.65 $\mu m \times 1.8$ $\mu m$ and a gate oxide of 7 nm.

Figure 4:
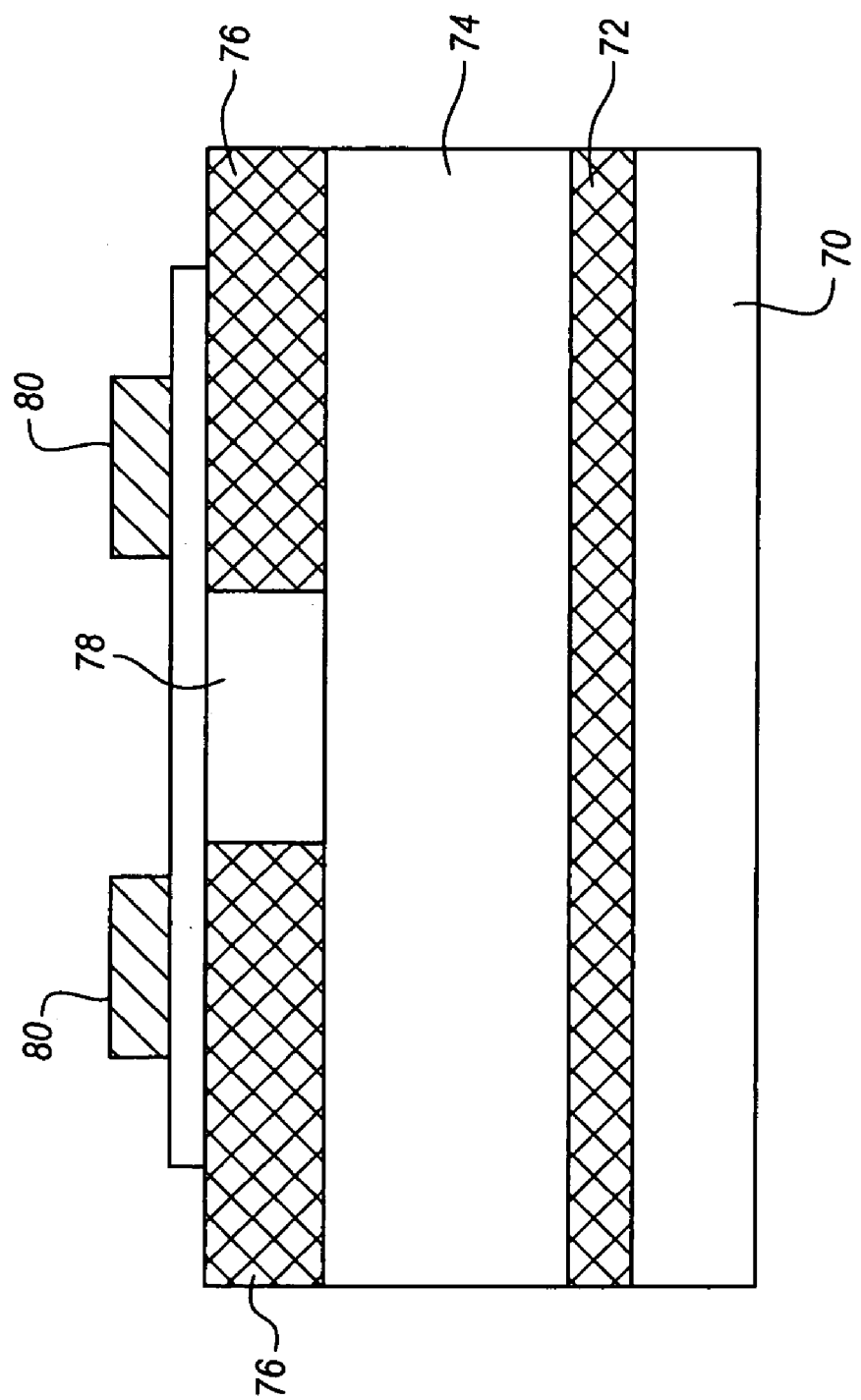
FIG. 4 is a cross-sectional view of a waveguide with a capacitive modulator according to an embodiment of the invention.

FIG. 4 shows a cross sectional view of a silicon waveguide to which a transistor driver is coupled as may be used for the waveguides of FIGS. 1, 2, and 3. The system is built on a silicon substrate 70. This is covered with a layer of buried oxide 72. A layer of doped silicon 74, in this example n-doped silicon is formed over the oxide. Two long ridges 76 of oxide are then formed over the doped silicon. The two ridges form a channel between them. The channel is filled with a layer of doped polysilicon to form the waveguide 78 and the transistor gate. The waveguide is p-doped in this example of the n-doped silicon layer.

A top undoped polysilicon layer is formed over the tops of the oxide ridges and metal contact pads 80, for example aluminum pads, are formed on either side of the waveguide channel over the polysilicon layer. The two oxide ridges form a source and a drain for a transistor across the gate waveguide. The voltage between the two oxide layers generates an electric field across the waveguide. By placing the metal contacts to the side rather than on top of the rib waveguide 78, the optical absorption due to the metal contacts is almost eliminated.

The oxide regions 76 on either side of the waveguide maintain optical confinement and prevent the optical field from penetrating into the areas where the metal contacts are located. To make Ohmic contacts to the metal, both the crystalline silicon slab and poly-silicon may have a surface doping concentration of $1 \times 10^{19}$ cm$^{-3}$. The particular structure of the waveguide and integrated transistor may be modified to suit different applications and to accommodate advancements and improvements.

The active drivers may further be used to adjust for different modulators, or modulators made from different semiconductor materials, for example any compound semiconductors, such as InP or GaAs, among others. The active drivers may be set with values to compensate waveguides with a wide range of different capacitances or impedances and to accommodate modulators that have an optical waveguide formed of other materials to suit a variety of different applications.

Figure 5:
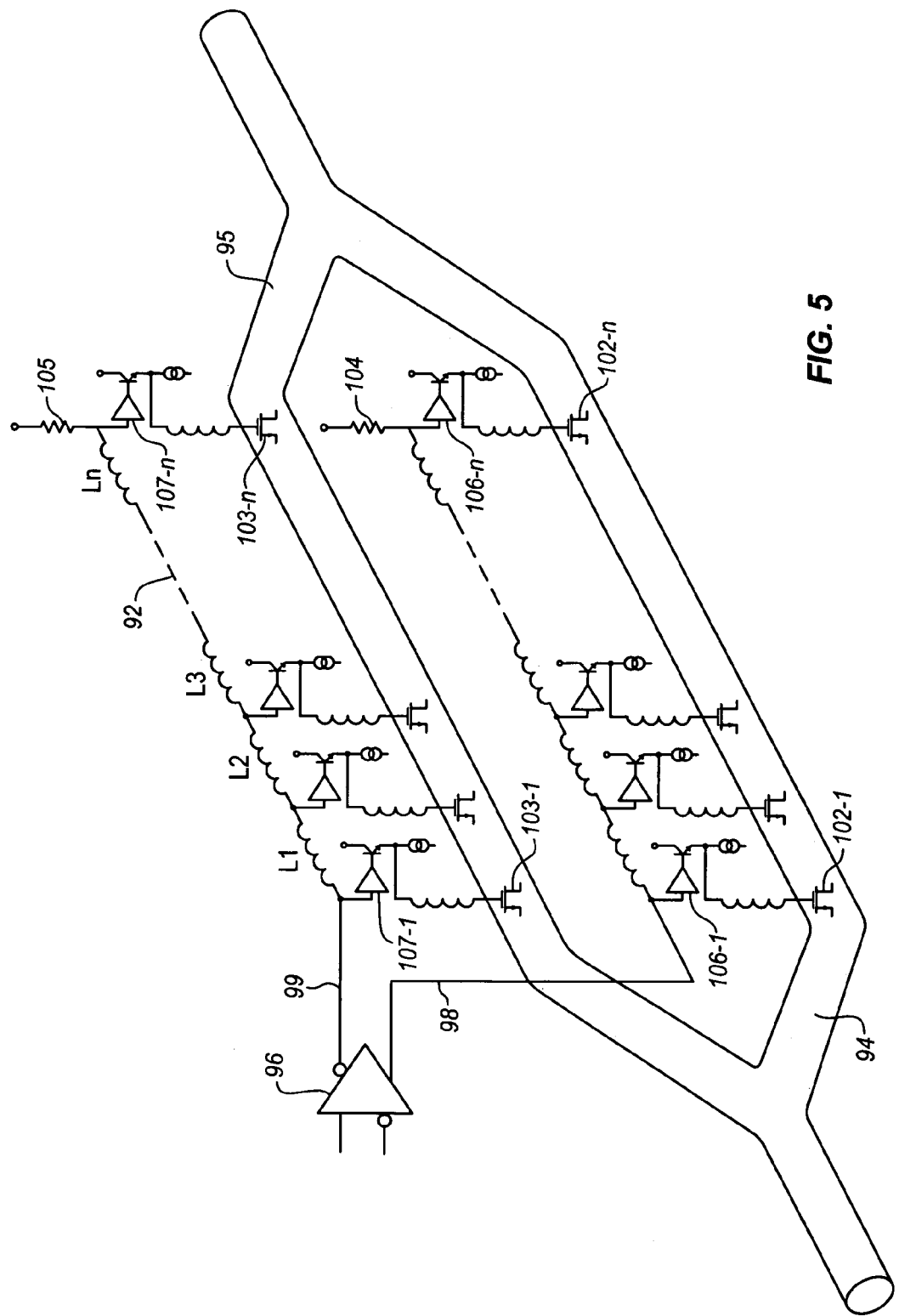
FIG. 5 is a functional electric diagram of a Mach Zehnder modulator incorporating the waveguide of FIG. 3 according to an embodiment of the invention.

FIG. 5 shows an example of combining two parallel waveguides 94, 95 to obtain a Mach Zehnder modulator. The driver circuitry for the first branch 94 is constructed in the same way as in FIG. 3, although other designs may be used including those of FIGS. 1 and 2. A driver 96 has positive and negative outputs and the positive output 98 is applied to a sequence of driver circuits 106-1 to 106-$n$ that apply a voltage across the capacitive ribs 1202-1 to 102-$n$ as described above with respect to FIG. 4.

The parallel branch 95 is coupled to the negative output 99 of the driver which connects to a sequence of drivers 107-1 to 107-$n$ to send a voltage to the coupled transistors 103-1 to 103-$n$ as described above in the context of FIGS. 1-4. The parallel waveguides of a Mach Zehnder modulator have a variety of uses and embodiments of the invention may be applied to many other uses as well.

Figure 6:
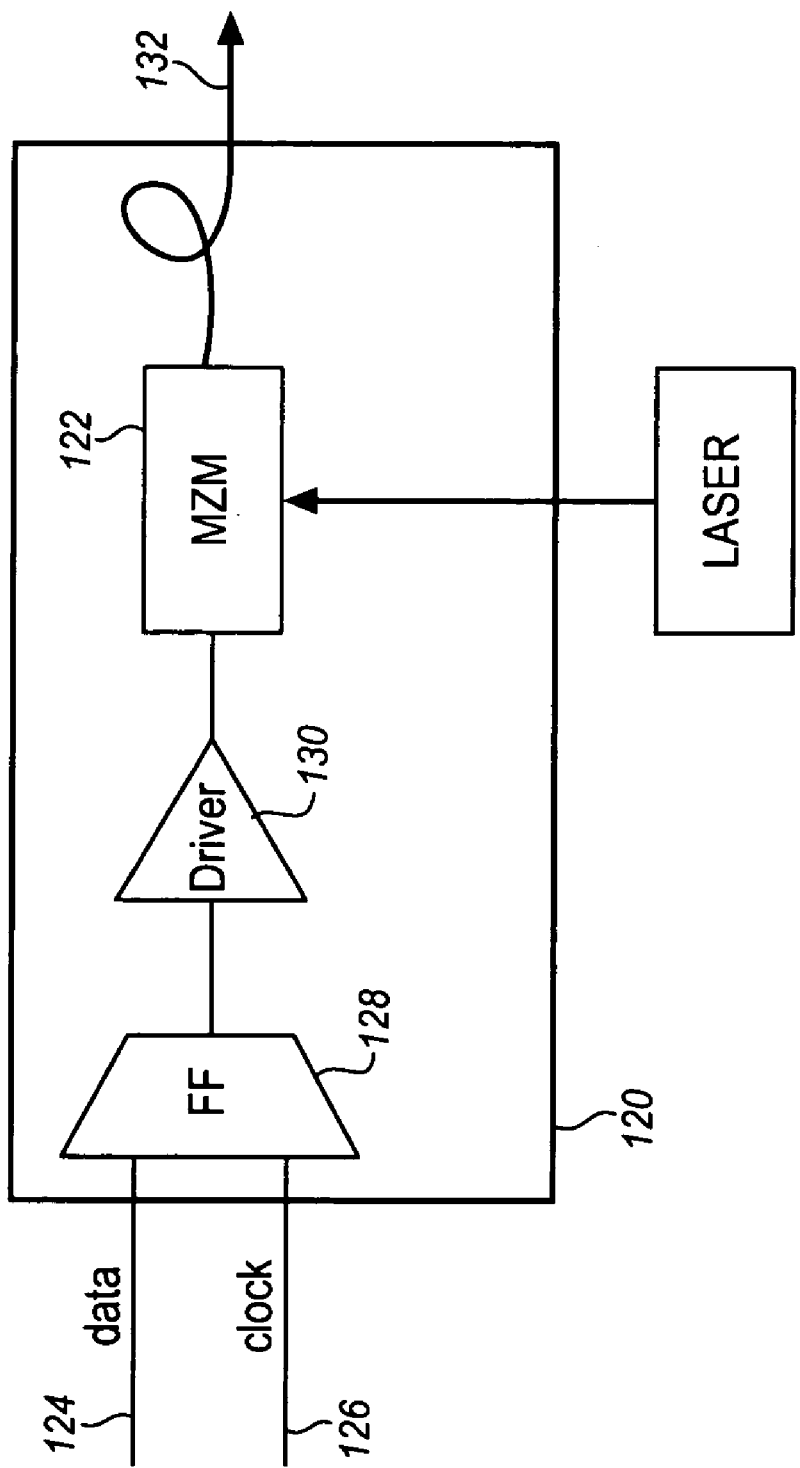
FIG. 6 is a block diagram of an optical transmitter incorporating a Mach Zehnder modulator according to an embodiment of the invention.

FIG. 6 is block diagram of portion of a transmitter, useful for example with an optical transceiver. Such a transceiver may use a Mach Zehnder modulator 122 such as the MZM of FIG. 5, although such modulators may be applied to many other applications. In the example of FIG. 6, the transceiver 120 receives data 124 and a clock line 126 from an external source or an internal VCO (voltage controlled oscillator). The data signal is retimed with the clock signal in a flip-flop, amplified in a driver 130 and then fed as a modulation signal to the MZM 122. The clock line 126 may come from an external source, such as a router, network node or other device. A regulated laser light source 134 is fed to the waveguides of the MZM to be modulated by the data signal. The laser may be part of the module, or placed on the same chip, or it may part of a be a central optical power supply. The combined signal is then provided to the optic fiber output 132 of the transmitter.

A lesser or more complicated waveguide, driver circuits, modulator or transmitter may be used than those shown and described herein. Therefore, the configurations may vary from implementation to implementation depending upon numerous factors, such as price constraints, performance requirements, technological improvements, or other circumstances. Embodiments of the invention may also be applied to other types of systems that use different inputs and outputs than those shown and described herein.

Many of the methods and apparatus are described in their most basic form but steps may be added to or deleted from any of the methods and components may be added or subtracted from any of the described apparatus without departing from the basic scope of the present invention. It will be apparent to those skilled in the art that many further modifications and adaptations may be made. The particular embodiments are not provided to limit the invention but to illustrate it. The scope of the present invention is not to be determined by the specific examples provided above but only by the claims below.

What is claimed is:

1. An active waveguide comprising:
   an optical waveguide;
   a plurality of modulators integrated into the waveguide to modulate the index of refraction of the waveguide, each modulator having a source on one side of the waveguide and a drain on the other side of the waveguide;
   a voltage driver; and
   a plurality of level shifters each coupled to the voltage driver and to a modulator to drive the voltage from the voltage driver to one of the plurality of modulators.

2. The active waveguide of claim 1, wherein the waveguide serves as a gate for each modulator.

3. The active waveguide of claim 1, further comprising a plurality of buffers, each coupled to one of the plurality of level shifters on one side and to the voltage driver on the other.

4. The active waveguide of claim 3, wherein the voltage driver comprises a level shifter.

5. The active waveguide of claim 3, further comprising a second level shifter coupled to the buffer and to a modulator.

6. The active waveguide of claim 1, wherein the source and drain each comprise charge carrying oxide layers.

7. The active waveguide of claim 1, wherein the waveguide is formed of a silicon material, the modulators are formed of a silicon oxide and the level shifters are formed of a metal oxide semiconductor material.

8. The active waveguide of claim 1, wherein the waveguide is formed of doped polysilicon and the phase modulators comprise a plurality of complementary metal oxide semiconductor transistors with gates across the waveguide.

9. The active waveguide of claim 1, wherein the modulators are further to drive an electric field into the waveguide, the active waveguide further comprising:
   a second optical waveguide;
   a second plurality of modulators integrated into the second waveguide to drive an electrical field into the waveguide, the electrical field having a polarity opposite that of the first electrical field; and
   a plurality of local amplifiers, each coupled to a modulator.

10. The active waveguide of claim 1, wherein the waveguide is integrated on a silicon substrate and the level shifters are integrated on the same silicon substrate.

11. The active waveguide of claim 10, wherein the waveguide is formed of doped polysilicon bounded by ridges of oxide and wherein the oxide ridges from the source and drain of the modulators.

12. An optical transmitter comprising:
   an input data retiming circuit;
   an optical source;
   an optical waveguide to receive light from the optical source and couple it into an output optical fiber;
   a plurality of phase modulators integrated into the waveguide to drive an electrical field into the waveguide to modulate the light from the optical source, each modulator having a source on one side of the waveguide and a drain on the other side of the waveguide;
   a voltage driver; and
   a plurality of level shifters each coupled to the voltage driver and to a modulator to drive the voltage from the voltage driver to on of the plurality of phase modulators.

13. The transmitter of claim 12, further comprising an amplifier stage between the data retiming circuit and the plurality of level shifters.

14. The transmitter of claim 12, wherein the phase modulators each comprise a pair of charge carrying oxide layers.

15. The transmitter of claim 12, wherein the waveguide is formed of doped polysilicon and the phase modulators comprise a plurality of complementary metal oxide semiconductor transistors with gates across the waveguide.

16. A method comprising:
   forming a polysilicon optical waveguide on a silicon substrate;
   forming a plurality of oxide modulators on the silicon substrate to modulate the index of refraction of the waveguide each modulator having an oxide source on one side of the waveguide and an oxide drain on the other side of the waveguide;
   forming a voltage driver on the silicon substrate; and
   forming a plurality of metal oxide semiconductor level shifters local amplifiers on the silicon substrate, each coupled to the voltage driver and to a modulator to drive a respective modulator.

17. The method of claim 16, wherein forming the plurality of level shifters comprises forming an oxide ridge on either side of the waveguide and wherein the waveguide serves as a gate for each modulator.

18. The method of claim 16, wherein forming the polysilicon waveguide further comprises forming the waveguide over a layer of doped silicon and doping the polysilicon complementary to the doped silicon layer.

* * * * *